United States Patent
Held

Patent Number: 5,429,850
Date of Patent: Jul. 4, 1995

[54] ULTRA-THIN ADHESIVE TAPE, ROLL OF COMPOSITE MATERIAL FOR OBTAINING IT AND METHOD FOR PROVIDING THEM

[75] Inventor: Alfons N. Held, Luxembourg, Luxembourg

[73] Assignee: E. I. Du Pont de Nemours and Company, Wilmington, Del.

[21] Appl. No.: 182,151

[22] Filed: Feb. 1, 1994

[30] Foreign Application Priority Data

Aug. 2, 1991 [FR] France .................. 91 09858

[51] Int. Cl.6 .................................. C09J 7/02
[52] U.S. Cl. ........................ 428/40; 156/90; 156/184; 156/230; 156/231; 156/238; 156/247; 156/291; 156/295; 206/411; 427/177; 427/208.2; 428/202; 428/216; 428/334; 428/335; 428/336; 428/337; 428/343; 428/352; 428/354; 428/906; 428/914
[58] Field of Search .............. 156/90, 184, 231, 238, 156/247, 291, 295; 206/411; 427/177, 208.2; 428/40, 202, 216, 334, 335, 336, 337, 343, 352, 354, 906, 914

[56] References Cited

U.S. PATENT DOCUMENTS

| | | |
|---|---|---|
| 2,601,016 | 6/1952 | Hendricks et al. . |
| 2,880,862 | 4/1959 | Sermattei . |
| 2,925,174 | 2/1960 | Stow et al. . |
| 4,418,120 | 11/1983 | Kealy et al. . |
| 4,652,473 | 3/1987 | Han . |
| 4,673,611 | 6/1987 | Cross . |
| 4,749,432 | 6/1988 | Masatoshi et al. . |

FOREIGN PATENT DOCUMENTS

| | | |
|---|---|---|
| 842983 | 8/1960 | United Kingdom . |
| 1116262 | 6/1988 | United Kingdom . |

*Primary Examiner*—James C. Cannon

[57] ABSTRACT

An adhesive tape is provided which is obtained starting from a roll of composite material consisting of a first continuous strip or tape of film material and a second continuous strip in a material having low adherence to adhesives, such as a siliconized continuous backing strip, the film material being a high-strength polymeric material film having adhered to one face thereof at least one extremely thin continuous run of adhesive obtained by applying said continuous backing strip onto said tape whereby said adhesive remains on said tape after removal of said continuous backing strip by virtue of the greater adhesion of said adhesive to said tape than to said continuous backing strip, said adhesive tape being useful for splicing continuous webs of thin films.

15 Claims, 1 Drawing Sheet

ULTRA-THIN ADHESIVE TAPE, ROLL OF COMPOSITE MATERIAL FOR OBTAINING IT AND METHOD FOR PROVIDING THEM

BACKGROUND OF THE INVENTION

The present invention relates to a method for obtaining a composite material comprising a first continuous strip of a film of a polymeric material and a second continuous strip exhibiting low adherence towards adhesives and substantially of the same length as said first continuous strip and having a thickness that is at least several times greater than the thickness of said film, a continuous layer of adhesive being provided between said first and second strips, the second continuous strip being sufficiently wide to at least cover said adhesive, the adhesive having a power of adhesion to said second continuous strip that is distinctly less than its power of adhesion to the material constituting said first continuous strip. It also relates to a roll of composite material obtained by carrying out the above method and to an adhesive tape obtained from said roll.

Such adhesive tape is particularly suitable for use in splicing of two films, the ends of which are close but are not in abutment, of a very thin material such as a polymeric material film subjected to biaxial stretching, marketed under the trade name Mylar ®, notably when the film that has been spliced in this way is required to go through winding or 5 unwinding apparatus at very high speed, while optionally being simultaneously slit longitudinally into narrower widths. Any notable excess thickness in the region of the joint upsets smooth running of the film or requires the speed at which it is traveling to be considerably reduced which is obviously not desirable. Such incidents occur when conventional adhesive tapes having a thickness of around 30 μm are employed.

It is currently necessary to join a polymeric material films of extremely small thickness (around 2 μm, the thickness of certain Mylar ® films sometimes being as low as 0.9 μm), using an ultra-thin tape. However, the provision of such an adhesive tape of extremely small thickness gives rise to considerable technical problems. Indeed, when dealing with such small thicknesses, the support that is to receive the adhesive, in other words the tape's substrate or body is practically impalpable and has practically no self-sustaining or mechanical properties because it is so thin (less than 3 μm). Under such conditions, deposition of an adhesive by conventional means, for example by surface application, is impossible.

One object of the present invention is to provide a method for obtaining an ultra-thin adhesive tape that allows a substrate of extremely reduced thickness to be used, such thickness being less than 5 μm and preferably of the order of 2 μm.

A further object of the invention is to enable an ultra-thin polymeric film substrate to be employed for this purpose said film being marketed under the trade name Mylar ®.

A further object is to provide an adhesive tape that is particularly suitable for splicing the non-abutting ends of very thin films of plastics material, for example webs or films in Mylar ® material, the adhesive tape being able to be readily handled prior and during this operation.

Another object of the invention is to provide a method for obtaining an adhesive tape and a roll of composite material used for dispensing lengths of adhesive tape that make it possible to splice two very strong and extremely thin plastics material films, such as Mylar ®, which are arranged in close proximity to each other without touching and are positioned extremely accurately, whereby splicing of two films of equal width placed notably in perfect axial alignment can be achieved.

SUMMARY OF THE INVENTION

The invention provides a method for obtaining a composite material comprising a first continuous strip of a film of a polymeric material and a second continuous strip exhibiting low adherence towards adhesives and substantially of the same length as said first continuous strip and having a thickness that is at least several times greater than the thickness of said film, a continuous layer of adhesive being provided between said first and second strips, the second continuous strip being sufficiently wide to at least cover said adhesive, said adhesive having a power of adhesion to said second continuous strip that is distinctly less than its power of adhesion to the material constituting said first continuous strip, comprising the steps of applying at least one continuous run of adhesive material onto one surface of said second continuous strip and over the whole length thereof, and establishing contact between said at least one continuous run of adhesive material and a surface of said first continuous strip thereby transferring said continuous run of adhesive from said second continuous strip onto the facing surface of said first continuous strip, said film being extremely thin and having a thickness of the order of or less less than 5 μm.

According to one feature of the invention the second continuous strip consists of silicone-impregnated paper. According to a further feature, the film is a polymeric material marketed under the trade name Mylar ®.

According to further features of the method according to the invention, the adhesive consists of a hotmelt self-adhesive type adhesive deposited in the form of a thin film having a thickness less than 5 μm. The adhesive is applied in a pattern comprising two parallel tracks or continuous runs with an adhesive-free region provided therebetween, leaving an adhesive-free edge zone between the tracks and each outer edge of the strip. The width of the said adhesive-free region is greater than the width of each one of the tracks. A wide adhesive-free region is the pattern that has been found to give the best results, as regards absence of sudden stresses and violent jolts and of course breakage during winding and unwinding at high speed, when the adhesive tape according to the invention is employed for Mylar ® film splicing under production conditions, which is surprising as it might be imagined that wider tracks with only a small gap between them would give a better and stronger splice.

When preparing the strip of composite material, highly accurate transfer of the adhesive from a relatively thick siliconized backing strip onto an ultra-thin tape is achieved, due to the stability of the backing strip. The handling difficulties and the lack of accuracy indicated above are avoided thanks to the good mechanical strength and rigidity provided by the siliconized backing strip, which is easily detached from the adhesive to which it barely adheres, and which ensures that highly accurate application to very thin film material that is to be spliced to further very thin film material can be achieved.

The invention also provides a roll of composite material comprising a first continuous strip of a film of a polymeric material and a second continuous strip exhibiting low adherence toward adhesives, substantially of the same length as the first continuous strip and having a thickness that is at least several times greater than the thickness of said film, a continuous layer of adhesive being provided between the first and second strips, the second continuous strip being sufficiently wide to at least cover said adhesive, said adhesive having a power of adhesion to said second continuous strip that is distinctly less than its power of adhesion to the material constituting said first continuous strip, the first continuous strip being in an extremely thin polymeric material of a thickness of the order of or less than 5 µm, the adhesive layer being provided in a pattern comprising at least one continuous run applied onto the second continuous strip and having been transferred onto the facing surface of the first continuous strip when contact is established between the adhesive and the surface of the first continuous strip.

The second continuous strip can consist of silicone-impregnated paper, while the first strip can be a film consisting of a polymeric material marketed under the trade name Mylar ®.

In one embodiment of the roll, the adhesive consists of a hotmelt type adhesive, and is deposited in the form of a thin film having a thickness less than 5 µm in a pattern comprising two parallel tracks or continuous runs with an adhesive-free region provided therebetween and between the tracks and the outer edges of the roll, the adhesive-free region between the tracks being wider than the width of each one of the tracks.

Depending on the application, and when multiple tracks or continuous runs of adhesive are employed, an adhesive of a different nature can be employed for each one of the tracks. The siliconized backing strip ensures that not only is the composite material adequately supported but the whole roll as well. At the time of use, the backing strip can be readily "peeled off" since it is easily detached from the adhesive which, in its turn adheres preferentially to the film onto which it was transferred.

The invention also provides an adhesive tape obtained using such a roll of composite material, the tape comprising a continuous strip of ultra-thin high-strength polymeric material film one face of which carries at least one continuous run of adhesive material transferred to said continuous strip of film through application of said second continuous strip to said continuous strip of film, with the adhesive remaining on the continuous strip of film after stripping-off of the second continuous strip by virtue of the reduced power of adhesion of the adhesive to the second continuous strip compared to that towards the continuous strip of film.

Other objects, advantages and features of the invention will become more clear from the description that follows of one embodiment provided by way of non-limiting example and with reference to the attached drawings.

DETAILED DESCRIPTION OF A PREFERRED EMBODIMENT

Figure 1:
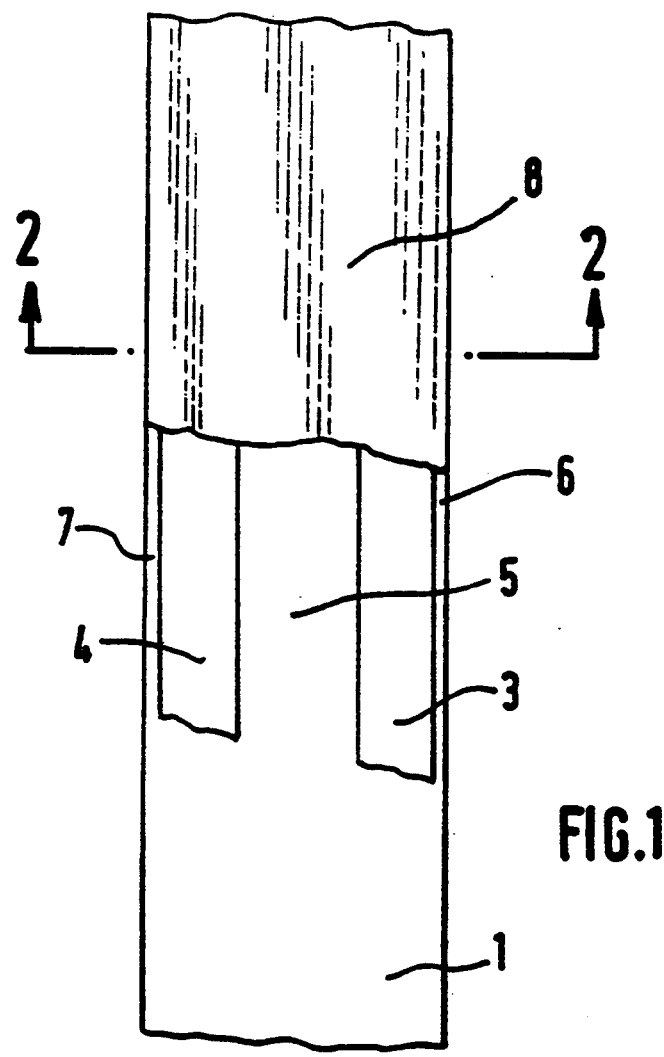
FIG. 1 is a top view, with parts of the surface removed to show the underlying structure, of an embodiment of the adhesive tape according to the invention.
Figure 2:
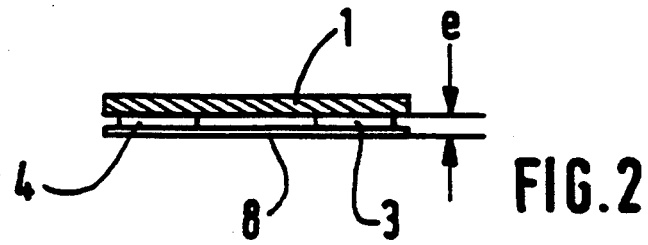
FIG. 2 is a sectional view along line 2—2 of FIG. 1.

In the embodiment chosen to illustrate the invention and shown in FIGS. 1 and 2, the ultra-thin adhesive tape according to the invention consists of a continuous backing strip 1 in a material that adheres poorly to adhesives, for example a siliconized paper strip of a width generally comprised in the range 20–50 mm and having a thickness of about 30 µm.

Two longitudinal parallel tracks or continuous runs 3 and 4 of an adhesive such as a hotmelt self-adhesive type adhesive are provided on one face of the backing strip 1. The adhesive is applied in a continuous layer which is extremely thin and is of the order of one micron thick, and in every case is less than 2 µm thick, the adhesive having been applied by any suitable means such as for example roller application. The thickness of the continuous run of adhesive is in any case very difficult to appreciate without its supporting backing strip and when we define the continuous run of adhesive as being ultra-thin what is meant is that after transfer of said adhesive continuous run onto a film of Mylar ® also extremely thin, of the order of a micron itself, and a pressing them both against a receiving support that is also in Mylar ®, the thickness of the ultra-thin Mylar ® support continuous strip plus adhesive does not exceed 6 µm. Account should be taken of the fact that a continuous run of adhesive which, at the time it is deposited onto a siliconized paper support or backing strip includes surface "roughnesses" some tens of microns high, gets spread out twice: once when being transferred onto the Mylar ® film and again when bonding and pressing onto the receiving support is carried out. The effective thickness of the adhesive continuous run, once it is definitively in place, can be further reduced by drying. Hence, the adhesive continuous run thickness that should be considered is that thickness which remains after the adhesive has been definitively applied and dried. Between the runs or tracks of adhesive 3 and 4 and the respective edges of the continuous backing strip, elongated bare regions 5, 6 and 7 are provided which are not coated with adhesive. The edge regions 6 and 7, which are quite narrow, are provided for preventing the adhesive from overflowing outwardly.

The actual adhesive tape 8 can now be obtained by bringing a film of a very thin and strong material, for example Mylar ®, of a thickness less than 3 µm into contact with the adhesive tracks 3 and 4, in perfect alignment with backing strip 1. The thickness e of said film, including the thickness of the actual adhesive, when it is applied against continuous backing strip 1, is preferably close to 5 µm.

As the adhesive has considerably greater adherence to the material of the film 8 than to the backing strip 1, the backing strip 1 can readily be peeled off from the adhesive which is vigorously applied, and over the whole surface thereof, against the very strong film 8.

Thus, at the moment of use, the continuous backing strip 1 can readily be peeled away from the tape 8, without any of the adhesive being entrained by the continuous backing strip, the adhesive tracks 3 and 4 being powerfully applied to the tape 8 as soon as the latter approaches and vigorously resisting any attempt to lift them off.

Prior to the said peeling operation, the complete adhesive tape carrying the backing 1 is easily handled thanks to the presence of the relatively thick paper backing which keeps the adhesive spread flat and without any ability to adhere to any extraneous support. The tape can notably be supplied in the form of a roll for use in a device for splicing two ultra-thin strips of film.

The ultra-thin adhesive tape, the roll of composite material for obtaining it and the methods for providing them according to the invention are obviously not limited to the embodiment that has just been described, but may be subject to numerous variations concerning, for example the choice of materials, the number of, and the pattern followed by the adhesive tracks, the nature of the actual adhesive etc., without this however leading to a departure from the scope of the invention.

What is claimed is:

1. A method for obtaining a composite material comprising a first continuous strip of a film of a polymeric material with a thickness of the order of or less than 5 μm and a second continuous strip exhibiting low adherence towards adhesives and being of substantially the same length as said first continuous strip and having a thickness that is at least several times greater than the thickness of said film, parallel continuous runs of adhesive material with an adhesive-free region therebetween being provided between said first and second strips, said second continuous strip being sufficiently wide to at least cover said adhesive runs, said adhesive having a power of adhesion to said second continuous strip that is distinctly less than its power of adhesion to the material constituting said first continuous strip, comprising the steps of:

applying parallel continuous runs of adhesive material with an adhesive-free region therebetween onto one surface of said second continuous strip and over the whole length thereof, and establishing contact between said adhesive material and a surface of said first continuous strip thereby transferring adhesive from said second continuous strip onto the facing surface of said first continuous strip.

2. A method according to claim 1, wherein the width of said adhesive-free region is greater than the width of each one of said continuous runs.

3. A method according to claim 1, wherein said adhesive is provided in a pattern such that an adhesive-free edge zone exists between each one of the outer edges of said second continuous strip and the adjacent outer edge of each one of said continuous runs, said adhesive-free zone edge being sufficiently wide to absorb spreading of said adhesive after transfer thereof onto said first continuous strip.

4. A method according to claim 1, wherein said second continuous strip consists of a silicone-impregnated paper.

5. A method according to claim 1, wherein said film comprises polyethylene terephthalate.

6. A method according to claim 1, wherein said adhesive consists of a hotmelt self-adhesive type adhesive.

7. A method according to claim 1, wherein said adhesive is deposited onto said second continuous strip in the form of a thin film having a thickness less than 5 μm.

8. A roll of composite material comprising a first continuous strip of a film of a polymeric material with a thickness of the order of or less than 5 μm and a second continuous strip exhibiting low adherence towards adhesives, substantially of the same length as said first continuous strip and having a thickness that is at least several times greater than the thickness of said film, parallel continuous runs of adhesive material with an adhesive-free region therebetween being provided between said first and second strips, said second continuous strip being sufficiently wide to at least cover said adhesive runs, said adhesive having a power of adhesion to said second continuous strip that is distinctly less than its power of adhesion to the material constituting said first continuous strip, and said adhesive runs having been transferred onto the facing surface of said first continuous strip from said second continuous strip upon contact of the surface of said first continuous strip with said adhesive runs.

9. A roll of composite material according to claim 8, wherein the width of said adhesive-free region is greater than the width of each one of said continuous runs.

10. A roll of composite material according to claim 8, wherein said adhesive is provided in a pattern such than an adhesive-free edge zone is provided between each one of the outer edges of said continuous strip and the adjacent outer edge of each one of said continuous runs.

11. A roll of composite material according to claim 8, wherein said second continuous strip consists of a silicone-impregnated paper.

12. A roll of composite material according to claim 8, wherein said film comprises polyethylene terephthalate.

13. A roll of composite material according to claim 8, wherein said adhesive consists of a hotmelt self-adhesive type adhesive.

14. A roll of composite material according to claim 8, wherein said adhesive is deposited in the form of a thin film having a thickness less than 5 μm.

15. An adhesive tape obtained using a roll of composite material according to claim 8 comprising a tape of ultra-thin high-strength polymeric material film one face of which carries two continuous runs of adhesive material transferred to said tape of film through application of a continuous backing strip to said tape of film, with said adhesive remaining on said tape of film after stripping-off of said continuous backing strip by virtue of the reduced power of adhesion of said adhesive to said continuous backing strip compared to that towards said tape of film.

* * * * *